(No Model.)

F. RIGHTMYER.
CISTERN CLEANER.

No. 565,925. Patented Aug. 18, 1896.

WITNESSES:
Fred Ernest
Frank Hatt

INVENTOR
Frank Rightmyer
BY
ATTORNEY

UNITED STATES PATENT OFFICE.

FRANK RIGHTMYER, OF SPRINGFIELD, OHIO, ASSIGNOR TO MARCELLUS D. JOHNSTON, OF SAME PLACE.

CISTERN-CLEANER.

SPECIFICATION forming part of Letters Patent No. 565,925, dated August 18, 1896.

Application filed March 10, 1896. Serial No. 582,533. (No model.)

*To all whom it may concern:*

Be it known that I, FRANK RIGHTMYER, a citizen of the United States, residing at Springfield, in the county of Clark and State of Ohio, have invented a certain new and useful Improvement in Cistern-Cleaners, of which the following is a specification.

My invention relates to improvements in cistern-cleaners.

The object of my invention is to provide a device of simple and novel construction adapted for cleaning the bottoms of cisterns, without removing the water therefrom, by drawing up a portion of the accumulated mud and other foreign substances from the bottom thereof and elevating it to the surface. I accomplish these objects by the constructions shown in the accompanying drawings, in which—

Figure 2:
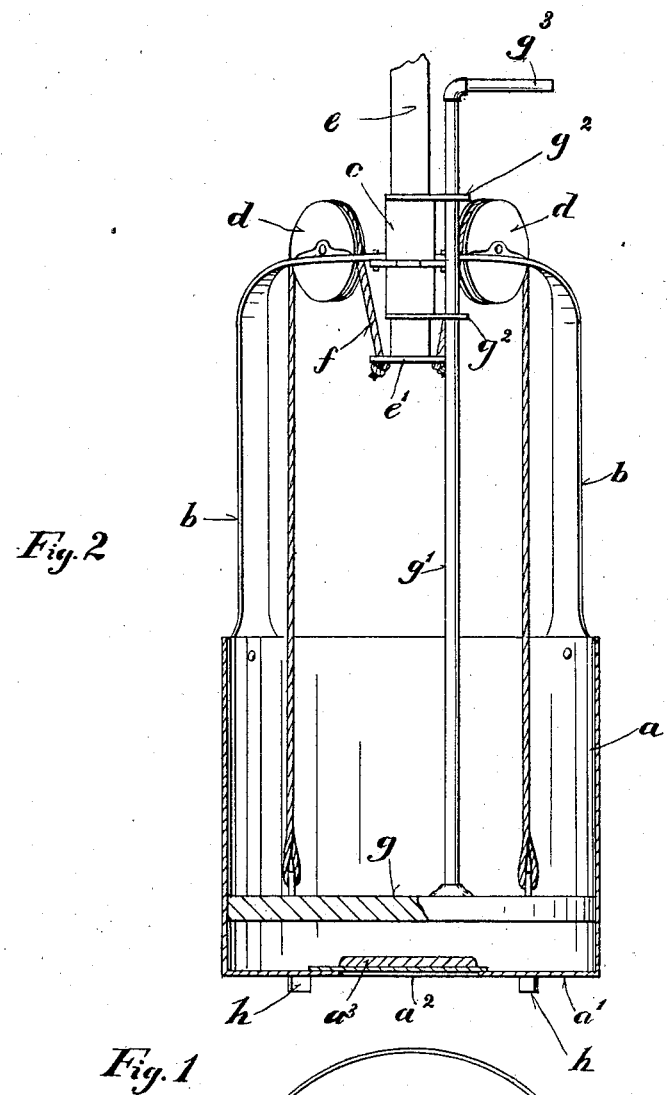
Figure 1:
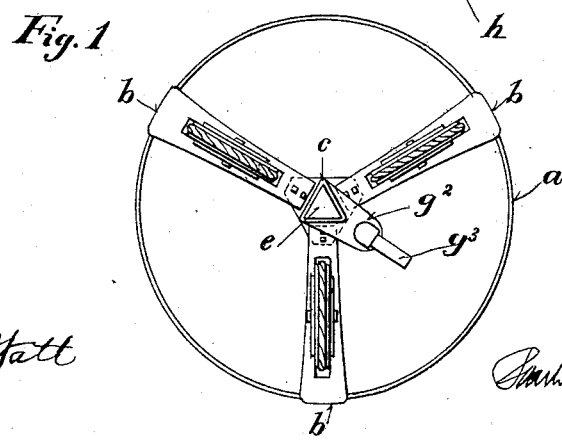

Figure 1 is a top or plan view of a device embodying my invention. Fig. 2 is a vertical section of the same.

Like parts are represented by similar letters of reference in both views.

In the said drawings, $a$ represents an outer cylindrical shell or casing, preferably formed of sheet metal, the bottom $a'$ being formed with an opening $a^2$, adapted to be normally closed by a valve $a^3$. This cylindrical shell or casing has affixed to its top upwardly-extending arms $b$, three of which are preferably used, these arms being curved inwardly at the top and joined to a central support $c$. Each of the arms $b$ is provided with a slotted opening, in which is arranged a pulley or sheave $d$, journaled in suitable bearings supported on said arm. The central support $c$ is formed in the nature of a sleeve or bearing, preferably triangular in shape, and is adapted to receive and support a reciprocating rod or handle $e$, similarly formed in cross-section. The bar $e$ is provided at the bottom with a plate $e'$, to which is secured one end of each of three flexible connections $f$, preferably cables or chains, each of which extends over one of the pulleys $d$ and is attached to a piston or plunger $g$, which fits snugly in the cylindrical shell or casing $a$. Extending upwardly from the piston or plunger $g$ is a rod $g'$, which passes through suitable supporting-bearings $g^2$ on the central support $c$ and is preferably formed at the top with an angular projection in the nature of a handle $g^3$. Suitable lugs or projections $h$ are preferably supplied to the bottom $a'$ to act in the nature of feet to support said bottom.

In operation the handle $e$ is extended to any suitable or desirable length. The plunger $g$ being forced downwardly to near the bottom of the shell $a$, the said shell is lowered into the cistern until the feet or projections $h$ rest on the bottom thereof. The handle $e$ is then forced downwardly, which, through the medium of the connections $f$, causes the plunger $g$ to be elevated and draws into the cylinder, through the valved opening $a^2$, a quantity of the dirt and foreign substances on the bottom of the cistern. The device is then removed and the cylinder discharged. The plunger $g$ is then again forced to the bottom, through the medium of the handle $g^3$, and the operation is repeated.

Having thus described my invention, I claim—

The combination with the outer cylindrical shell or casing open at the top and closed at the bottom by an inwardly-opening valve, said shell or casing having upwardly-extending arms curved inwardly at the top and joined to a central support arranged above the cylinder, a reciprocating plunger adapted to fit said casing and having connected thereto three flexible connections which extend over suitable sheaves or pulleys, which latter are journaled on said supporting-arms, a reciprocating handle journaled in said central support and connected at its lower end to the three flexible connections from said plunger, and an auxiliary handle journaled in bearings on said central support and connected at its lower end to said plunger, substantially as specified.

FRANK RIGHTMYER.

In presence of—
OLIVER H. MILLER,
CHAS. I. WELCH.